US008239834B2

(12) United States Patent  
Tsukamoto

(10) Patent No.: US 8,239,834 B2  
(45) Date of Patent: Aug. 7, 2012

(54) METHOD AND SYSTEM OF PROGRAM DEVELOPMENT SUPPORTING

(75) Inventor: Yasutaka Tsukamoto, Kanagawa-Ken (JP)

(73) Assignee: Ricoh Company, Ltd., Tokyo (JP)

( * ) Notice: Subject to any disclaimer, the term of this patent is extended or adjusted under 35 U.S.C. 154(b) by 1339 days.

(21) Appl. No.: 11/414,397

(22) Filed: May 1, 2006

(65) Prior Publication Data

US 2006/0248505 A1 Nov. 2, 2006

(30) Foreign Application Priority Data

May 2, 2005 (JP) ................................. 2005-134432

(51) Int. Cl.
*G06F 9/44* (2006.01)

(52) U.S. Cl. ....................................................... 717/126

(58) Field of Classification Search .................. 717/114, 717/131, 106, 141, 124, 126, 135; 716/5, 716/18, 2, 6; 703/2, 13–14; 700/17; 714/741; 718/102; 715/751, 762

See application file for complete search history.

(56) References Cited

U.S. PATENT DOCUMENTS

| | | | | | |
|---|---|---|---|---|---|
| 5,410,648 | A | * | 4/1995 | Pazel | 717/124 |
| 6,275,223 | B1 | * | 8/2001 | Hughes | 715/751 |
| 6,691,301 | B2 | * | 2/2004 | Bowen | 717/114 |
| 7,418,680 | B2 | * | 8/2008 | Clarke et al. | 716/5 |
| 7,703,026 | B2 | * | 4/2010 | Bechtold et al. | 715/762 |
| 2003/0145304 | A1 | * | 7/2003 | Carter | 716/18 |
| 2004/0111692 | A1 | * | 6/2004 | Bowyer et al. | 716/18 |
| 2005/0010598 | A1 | * | 1/2005 | Shankar | 707/104.1 |
| 2005/0187750 | A1 | * | 8/2005 | Satoh et al. | 703/14 |
| 2008/0306721 | A1 | * | 12/2008 | Yang | 703/14 |

FOREIGN PATENT DOCUMENTS

| | | |
|---|---|---|
| JP | 10-40131 A | 2/1998 |
| JP | 2000-181700 A | 6/2000 |
| JP | 2001-60210 A | 3/2001 |
| JP | 2001-222565 A | 8/2001 |
| JP | 2003-108629 A | 4/2003 |
| JP | 2004-145712 A | 5/2004 |

OTHER PUBLICATIONS

SystemC, "Version 2.0 User's Guide", Update for SystemC 2.0.1, copyright 1996-2002, pp. 1-212 <SystemC_02.pdf>.*
Yuyama, Y, et al., "Hardware/Software Codesign Using SystemC," Technical Report of IEICE.ICD 101(470), pp. 133-138, Nov. 29, 2001.

* cited by examiner

*Primary Examiner* — Tuan Anh Vu
(74) *Attorney, Agent, or Firm* — Dickstein Shapiro LLP

(57) ABSTRACT

A program development support system includes a reader, a designator, and a comparator. The reader is configured to read first and second programs executing operations which are expected to be identical to each other. The designator is configured to designate a variant pair of a first variant included in the first program and a second variant included in the second program. The first and second variants are expected to be identical to each other. The comparator is configured to compare values between the first and second variants when the first and second programs are executed.

7 Claims, 6 Drawing Sheets

| FIRST PROGRAM | SECOND PROGRAM |
|---|---|
| VARIANT A | VARIANT A' |
| VARIANT B | VARIANT B' |
| ⋮ | ⋮ |

FIG. 7

```
main(...)
{
...
    fp = fopen("data","r");
    data_in = read(fp);

A=calcA(data_in);
    printf("A=%d¥n",A);         ─── 81
    B=calcB(data_in);
    data_out = A + B;

printf("result=%d¥n",result);
}
```

FIG. 8

```
SC_MODULE(calc){
    sc_in< sc_uint<32> > data_in;
    sc_out< sc_uint<32> > data_out;

SC_CTOR(calc){
        SC_CTHREAD(calc_main,clk.pos());
    }
};
void calc_main()
{
    while(1){
        A'=calcA(data_in);
        printf("A'=%d¥n",A');       ─── 91
        B'=calcB(data_in);
        wait(1);
        data_out = A'+B';
        wait(1);
    }
}
```

FIG. 9

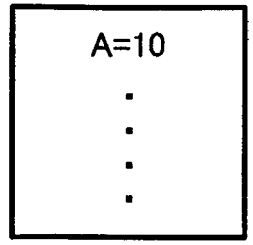

FIG. 10

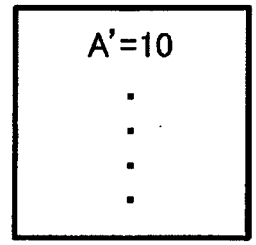

FIG. 11

```
                1                    |                2
main(...)                            | SC_MODULE(calc){
{                                    |     sc_in< sc_uint<32> > data_in;
   ...                               |     sc_out< sc_uint<32> > data_out;
   fp = fopen("data","r");           |
1c data_in = read(fp);                |     SC_CTOR(calc){
   ┌─────────────────────┐           |         SC_CTHREAD(calc_main,clk.pos());
   │ A=calcA(data_in);   │           |     }
   └─────────────────────┘           | };
   B=calcB(data_in);                 |
   data_out = A + B;                 | void calc_main()
                                     | {
   printf("result=%d¥n",result);     |     while(1){
}                                    |         ┌──────────────────────┐
                                     |         │ A'=calcA(data_in);   │
                                     |         └──────────────────────┘
                                     |         B'=calcB(data_in);
                                     |     2c  wait(1);
                                     |         data_out = A'+B';
                                     |         wait(1);
                                     |     }
                                     | }
```

METHOD AND SYSTEM OF PROGRAM DEVELOPMENT SUPPORTING

BACKGROUND OF THE INVENTION

1. Field of the Invention

The present patent specification describes a method and system for program development supporting, and more particularly to a method and system for program development supporting capable of effectively facilitating comparing and verifying operations of two or more programs.

2. Discussion of the Background

Designing an integrated circuit of a semiconductor generally includes three major steps. In a first step, an algorithm of a circuit is described into a program by using a general-purposed programming language such as C-language, and the program prepared in this way is used to verify correctness of the algorithm. Then, in a second step, a circuit is described according to the algorithm by using a system design language such as SystemC. In a third step, a program written with the general-purposed programming language is verified with a program written with the system design language.

In the process of designing circuitry, it often happens that a program developed with the general-purposed programming language differs from a circuit (i.e., a program) written with the system design language. This is because the circuit design involves an error. If two resultant programs do not match, a cause of it is needed to be traced in the circuit.

To find an error, a function such as "printf" is often used to indicate a value of an internal variant A. The function "printf" is referred to as a character string output function in the C-language. This function "printf" is added into the program of the general-purposed programming language, and the program is executed. Also, in the program written by the system design language, a function similar to "printf" for representing a value of an internal variant A' which is considered to take the same value as the internal variant A, and a logical simulation is executed. After that, the values of the internal variants A and A' are visually compared to check whether they are equivalent to each other. Such an operation is conducted on several variants to find a portion in the circuit description where the error is generated. Then, the program of the system design language is corrected piece by piece to eventually obtain a correct program.

SUMMARY OF THE INVENTION

This patent specification describes a novel program development support system. In one example, a novel program support system includes a reader, a designator, and a comparator. The reader is configured to read first and second programs executing operations which are expected to be identical to each other. The designator is configured to designate a variant pair of a first variant included in the first program and a second variant included in the second program. The first and second variants are expected to be identical to each other. The comparator is configured to compare values between the first and second variants when the first and second programs are executed.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is an illustration of an example first execution program;

FIG. 8 is an illustration of an example second execution program;

FIG. 9 is an illustration of an example indication of a variant value with respect to the first execution program;

FIG. 10 is an illustration of an example indication of a variant value with respect to the second execution program; and FIG. 11 is an illustration of an example source code screen indicating an event of temporarily stopping the program at a mismatch between the variant values compared.

DETAILED DESCRIPTION OF PREFERRED EMBODIMENTS

Figure 1:
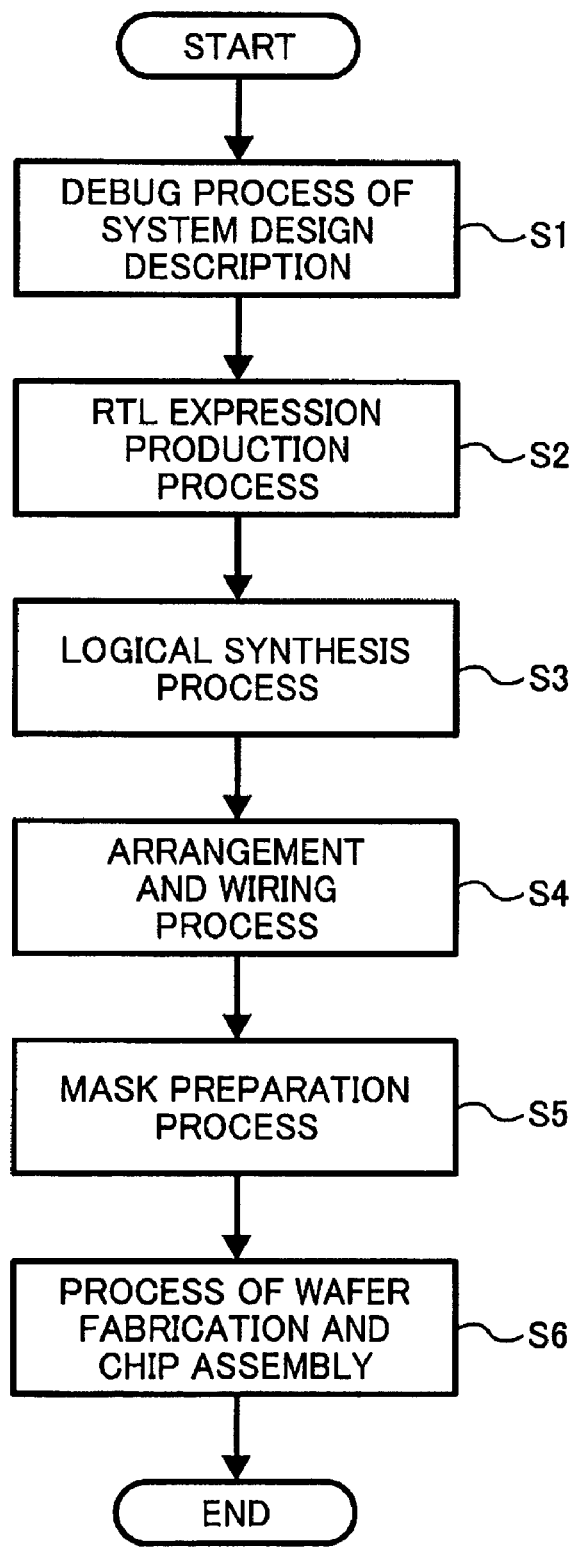
FIG. 1 is a flowchart showing a method of fabricating an integrated semiconductor circuit according an example embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a semiconductor fabrication method according to an example embodiment of the present invention is explained. This example fabrication method of semiconductor includes a plurality of steps, as shown in FIG. 1.

The method performs a debug process in Step S1. The debug process compares operations of two programs described in a general-purposed programming language and a system design language, for example. In this method, a target circuit algorithm is described as a program with the C-language, for example, as a general-purposed programming language. Also, another program representing the target circuit algorithm is prepared by using the SystemC language, for example, as one example system design language.

Then, the method performs an RTL (register transfer level) expression production process in Step S2. The RTL expression production process synthesizes operations by producing expressions according to an RTL (register transfer level) based on the program in the system design language which has been through the debug process of Step S1.

In Step S3, the method performs a logical synthesis process based on the RTL expressions produced in Step S2.

Then, the method performs Step S4 in which circuit components and wirings are arranged based on results of the logical synthesis, and Step S5 in which a mask is fabricated in accordance with the arrangement of circuit components and wirings.

Finally, the method performs a process of a wafer fabrication and a chip assembling.

Figure 2:
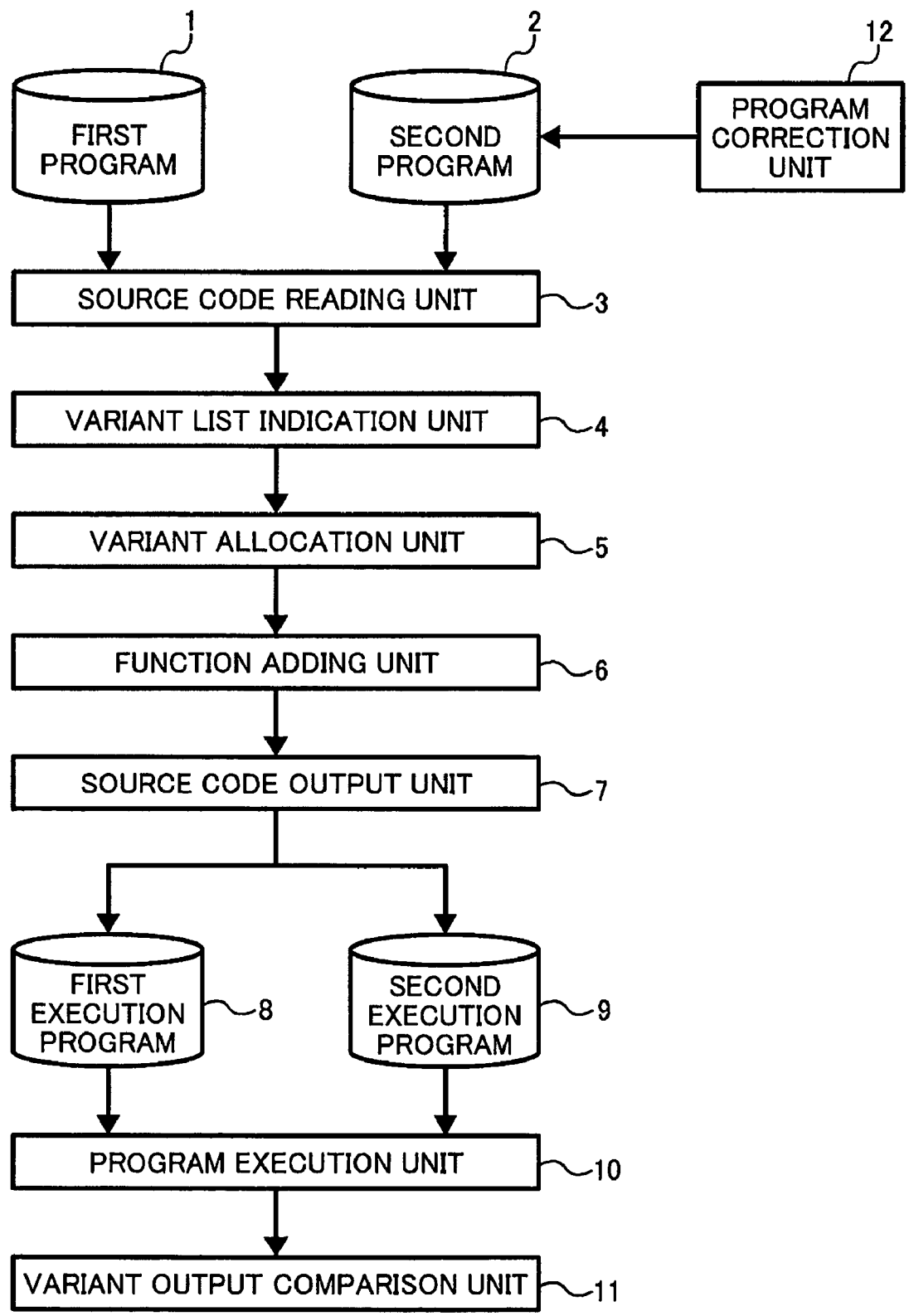
FIG. 2 is a schematic diagram of a program development support system executing an operation for debugging a system design description included in the method of FIG. 1.

Referring to FIG. 2, a program development support system according to one example of the present invention is explained. This system is capable of debugging a program in a system design language, that is, performing the abovementioned debug process of Step S1. As illustrated in FIG. 2, the program development system includes a first program 1, a second program 2, a source code reading unit 3, a variant list indication unit 4, a variant allocation unit 5, a function adding unit 6, and a source code output unit 7. The system further includes a first execution program 8, a second execution program 9, a program execution unit 10, a variant output comparison unit 11, and a program correction unit 12.

Figure 3:
FIG. 3 is an illustration of an example first program.
Figure 4:
FIG. 4 is an illustration of an example second program.

The first program 1 describes a target circuit algorithm in the C-language, for example, as a general-purposed programming language. One example of the first program is represented in FIG. 3, in which internal variants A and B are shown. The second program 2 also describes the target circuit algorithm but in the SystemC, for example, as one example system design language. One example of the second program is shown in FIG. 4, having internal variants A' and B'. These examples of FIGS. 3 and 4 are merely for reference purposes and therefore have descriptions different from actual environments. For example, the names of internal variants are provided with a mark of "'" (i.e., an apostrophe symbol), which is usually not appeared in the name of internal variant, so that a relationship between the internal variants A and A' are made clear. In addition, the C-language and the SystemC are merely examples and any other alternative programming languages or hardware description languages may be used.

The above-described first and second programs 1 and 2 are expected to execute the same operations and are subjected to a comparison. As illustrated in FIG. 2, the source code reading unit 3 reads the first and second programs 1 and 2.

Figures 5, 6:
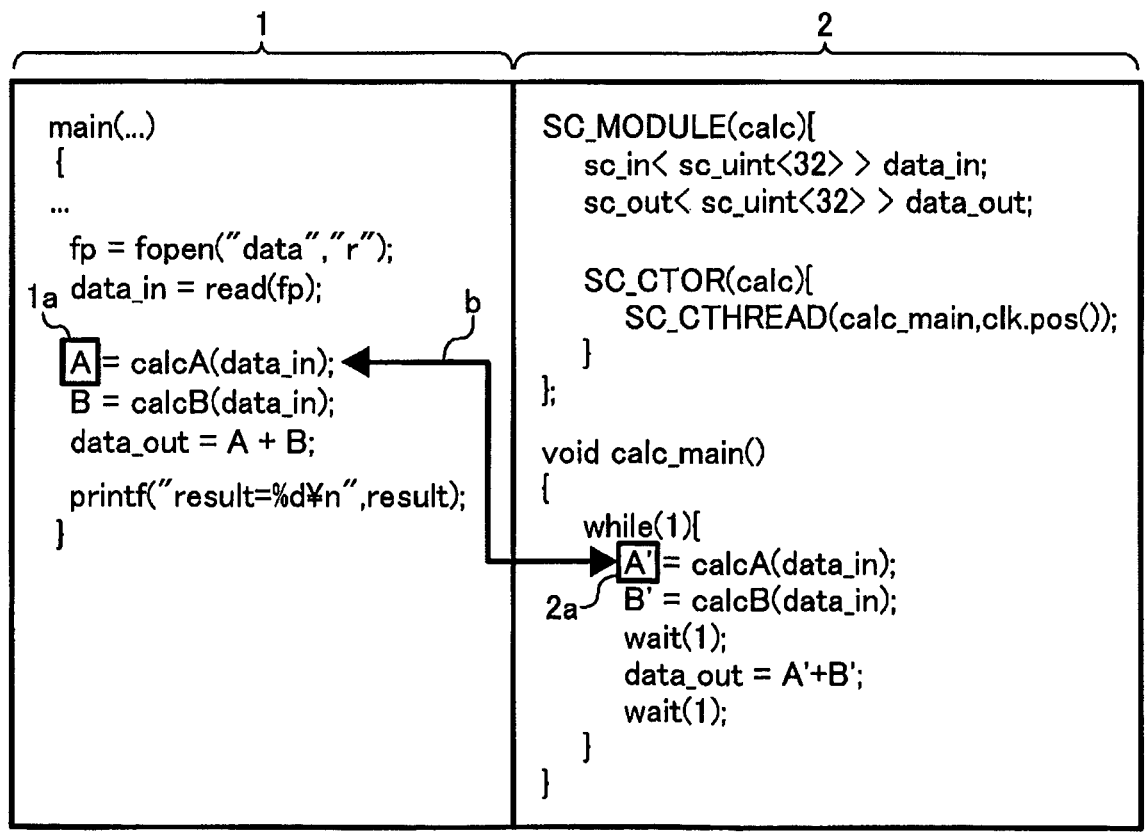
FIG. 5 is an illustration of an example variant list.
FIG. 6 is an illustration for explaining an example designation of an internal variant pair on a source code screen.

The variant list indication unit 4 analyzes the first and second programs 1 and 2 read by the source code reading unit 3 and indicates a variant list. FIG. 5 shows an example variant list indicated by the variant list indication unit 4, in which variants included in the first and second programs 1 and 2 are listed in decreasing order of appearance occurrence.

The variant allocation unit 5 honors a user designation for an internal variant pair of a first variant in the first program 1 and a second variant in the second program 2. The user designation may designate an internal variant pair with or without reference to the variant list of FIG. 5. It is also possible to allow a direct input of variants through a touch-sensing display of the variant list of FIG. 5. Any other possible way may be allowed. FIG. 6 shows an example user designation of an internal variant pair on a screen displaying source codes. On the screen, the first and second programs 1 and 2 are arranged side by side and, through a graphical user interface (GUI), the internal variants A and A' are highlighted into boxes 1a and 2a, respectively, with a click of a mouse button, for example. At the same time, it is possible to display a pair link b to indicate that the internal variants A and A' are designated as a pair by the user designation.

The function adding unit 6 prepare a variant value output function with respect to the first and second variants in the first and second programs, respectively, which are designated as the internal variant pair by the variant allocation unit 5. This variant value output function operates to return a value of each of the first and second variants.

The source code output unit 7 outputs a first execution program 8 corresponding to the first program 1 having the variant value output function and also a second execution program 9 corresponding to the second program 2 having the variant value output function, to a disc storage or a memory. FIG. 7 shows one example of the first execution program 8 in which a variant value output function 81 (i.e., printf("A=% d¥n",A);) for outputting a value of the internal variant A is added at a line following a calculation of the internal variant A (i.e., A=calcA(data_in);). Similarly, an example of the second execution program 9 is shown in FIG. 8, in which a variant value output function 91 (i.e., printf("A'=% d¥n",A');) for outputting a value of the internal variant A' is added at a line following a calculation of the internal variant A' (i.e., A=calcA(data_in);).

As described above, this embodiment uses the "printf" function to output a value of the variants. However, other functions may be selected in accordance with the programming language used. For example, a tracing function of a debugger can be used. That is, it may be possible to describe a tracing instruction into a file, for example, for controlling the debugger.

The program execution unit 10 executes the first and second execution programs 8 and 9. There are two cases. In one case, the first and second execution programs 1 and 2 are executed in turn. In another case, they are executed at the same time in parallel. As the first and second execution programs 1 and 2 are executed, the added variant value output functions 81 and 91 output values of the internal variants A and A' on a screen or to one of a disc storage and a memory.

FIG. 9 shows one example of variant indication with respect to the first execution program 8. The variant indication thus indicates a variant value each time the variant value output function 81 (see FIG. 7) in the execution program 8 is executed. Also, FIG. 9 shows a case of the first execution program 9. Similarly, a variant value is indicated each time of execution of the variant value output function 91 (see FIG. 8) in the execution program 9.

The variant output comparison unit 11 compares the values of the variants designated as an internal variant pair with respect to the first and second execution programs 8 and 9. Then, the variant output comparison unit 11 outputs a result of comparison on an as needed basis. The variant output comparison unit 11 can obtain information pertinent to the internal variant pair to be compared from the variant allocation unit 5. There are two cases of comparison. In one case, the variant output comparison unit 11 compares the values of the variants at a time after a sequential execution of the first and second execution programs 8 and 9. In another case, the variant output compassion unit 11 compares the values of the variants in parallel as the first and second execution programs 8 and 9 are executed at the same time in parallel. FIG. 11 shows one example of a screen indicating source codes temporarily stopping the execution of programs at a mismatch between the compared values of the variants. That is, when a mismatch is detected as a result the comparison between the values of the variants, the execution of the program is stopped and the variants of the mismatch are highlighted as boxes 1c and 2c.

The program correction unit 12 performs a correction on the second program 2 to eliminate a cause of the mismatch between the values of the variants, in accordance with a user instruction.

In this way, the semiconductor fabrication method according to an example embodiment of the present invention uses two programs to each of which a variant value output function is automatically prepared and added by designating a variant pair, and conducts the two programs so that a comparison of variants is automatically executed. That is, this method can allow an easy comparison of the variant values without a need of a manual insertion of an additional instructional description to the programs for indicating the variant values to be observed.

In addition, this method corrects the second program 2 to which no variant value output function has been added. Therefore, program versions can be controlled in an easy and appropriate manner. Moreover, this method does not require a process of deleting the variant value output function since it has not been added.

Although this embodiment described above reads and compares two program source codes, it is possible to do the same with more than two program source codes.

The contents of this patent specification may be conveniently implemented using a conventional general purpose digital computer programmed according to the teachings of the patent specification, as will be apparent to those skilled in the computer art. Appropriate software coding can readily be prepared by skilled programmers based on the teachings of the patent specification, as will be apparent to those skilled in the software art. The contents of this patent specification may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2005-134432 filed on May 2, 2005 in the Japan Patent Office, the entire contents of which are incorporated by reference herein.

What is claimed is:

1. A program development support system implemented on a digital computer, the electronic program development support system comprising:
    a reader configured to read first and second programs executing operations which are expected to be identical to each other, said first and second programs being written in respective programming languages which are different from one another;
    a variant list indicator configured to analyze the first and second programs read by the reader, to indicate a variant list comprising at least one variant pair, each of said at least one variant pair including a first variant from the first program and a second variant from the second program, respective values of the first and second variants in each variant pair being expected to be identical to each other, and to present the variant list to a user for designating one or more designated variant pairs from the at least one variant pair;
    a function adding unit configured to prepare variant value output functions with respect to each first and second variant in each designated variant pair;
    a program output unit configured to output first and second execution programs corresponding to the first and second programs, respectively, each one of the first and second execution programs having the respective variant value output function;
    a program executor configured to execute the first and second execution programs; and
    a comparator configured to compare values of the first and second variants of each designated variant pair when the first and second execution programs are executed,
    wherein the user designates the one or more variant pairs on a screen displaying source code of the first and second programs side by side, and the variant list indicator displays on the screen a link between the first variant and second variant of each designated variant pair.

2. The system of claim 1, wherein the user designates a plurality of variant pairs each pairing variant values expected to be equivalent to each other, and the comparator compares variant values of each one of the plurality of variant pairs.

3. The system of claim 1, wherein the comparator indicates a mismatch point when a mismatch occurs between the values of the first and second variants and stops the execution of the first and second execution programs.

4. The system of claim 1, further comprising:
    a correction unit configured to correct the second program.

5. A method of comparing operations of programs, comprising the steps of:
    reading first and second programs executing operations which are expected to be identical to each other, said first and second programs being written in respective programming languages which are different from one another;
    producing a variant list by analyzing the first and second programs read by the reader, the variant list comprising at least one variant pair, each of said at least one variant pair including a first variant from the first program and a second variant from the second program, respective values of the first and second variants in each variant pair being expected to be identical to each other;
    presenting the variant list to a user for designating one or more designated variant pairs from the at least one variant pair;
    preparing variant value output functions with respect to each first and second variant in each designated variant pair;
    outputting first and second execution programs corresponding to the first and second programs, respectively, each one of the first and second execution programs having the respective variant value output function;
    executing the first and second execution programs; and
    comparing values of the first and second variants of each designated variant pair when the first and second execution programs are executed,
    wherein the user designates the one or more variant pairs on a screen displaying source code of the first and second programs side by side, and the variant list indicator displays on the screen a link between the first variant and second variant of each designated variant pair.

6. A method of fabricating an integrated semiconductor, comprising the steps of:
    reading first and second programs executing operations which are expected to be identical to each other and describe said integrated semiconductor, said first and second programs being written in respective programming languages which are different from one another;
    producing a variant list by analyzing the first and second programs read by the reader, the variant list comprising at least one variant pair, each of said at least one variant pair including a first variant from the first program and a second variant from the second program, respective values of the first and second variants in each variant pair being expected to be identical to each other;
    presenting the variant list to a user for designating one or more designated variant pairs from the at least one variant pair;
    preparing variant value output functions with respect to the each first and second variant in each designated variant pair;
    outputting first and second execution programs corresponding to the first and second programs, respectively, each one of the first and second execution programs having the respective variant value output function;
    executing the first and second execution programs; and comparing values of the first and second variants of each designated variant pair when the first and second execution programs are executed, wherein the user designates the one or more variant pairs on a screen displaying source code of the first and second programs side by side, and the variant list indicator displays on the screen a link between the first variant and second variant of each designated variant pair.

7. A program development support circuit comprising:

a reader configured to read first and second programs executing operations which are expected to be identical to each other, said first and second programs being written in respective programming languages which are different from one another;

a variant list indicator including a display device, the variant list indicator configured to analyze the first and second programs read by the reader, to indicate a variant list comprising at least one variant pair, each of said at least one variant pair including a first variant from the first program and a second variant from the second program, respective values of the first and second variants in each variant pair being expected to be identical to each other, and to present on the display device the variant list to a user for designating via an input device one or more designated variant pairs from the at least one variant pair;

a function adding unit configured to prepare variant value output functions with respect to each first and second variant in each designated variant pair;

a program output unit configured to output first and second execution programs corresponding to the first and second programs, respectively, each one of the first and second execution programs having the respective variant value output function;

a program executor configured to execute the first and second execution programs; and a comparator configured to compare values of the first and second variants of each designated variant pair when the first and second execution programs are execute, wherein the user designates the one or more variant pairs on the display device displaying source code of the first and second programs side by side, and the variant list indicator displays on the display device a link between the first variant and second variant of each designated variant pair.

* * * * *